No. 784,516. PATENTED MAR. 7, 1905.
J. CHAMBLISS.
BICYCLE BRAKE.
APPLICATION FILED NOV. 18, 1903.
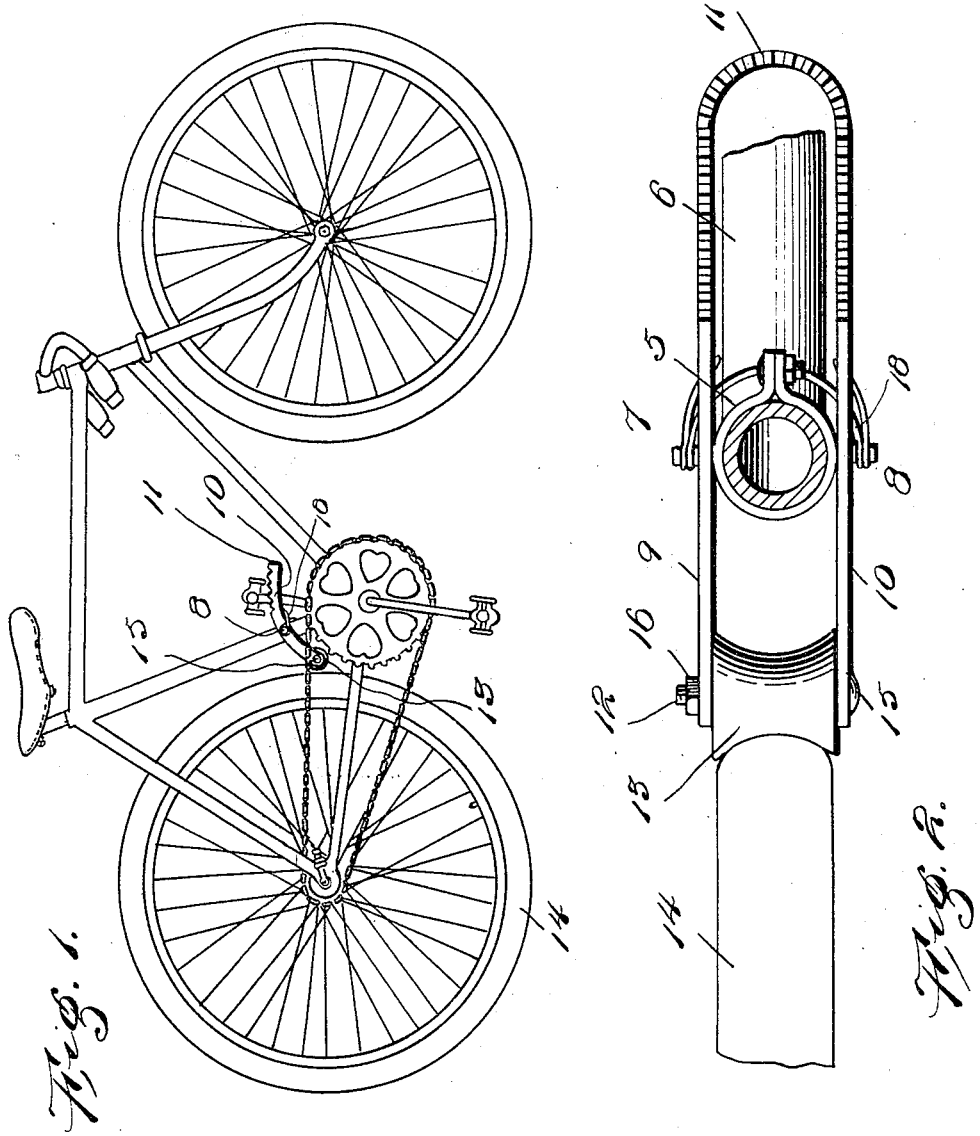
Witnesses
Inventor
J. Chambliss
By
Attorneys No. 784,516. Patented March 7, 1905.

UNITED STATES PATENT OFFICE.

JEFF CHAMBLISS, OF JACKSONS GAP, ALABAMA, ASSIGNOR OF ONE-FOURTH TO SOL YOUNG, OF ISLAND HOME, ALABAMA.

BICYCLE-BRAKE.

SPECIFICATION forming part of Letters Patent No. 784,516, dated March 7, 1905.

Application filed November 18, 1903. Serial No. 181,708

*To all whom it may concern:*

Be it known that I, JEFF CHAMBLISS, a citizen of the United States, residing at Jacksons Gap, in the county of Tallapoosa, State of Alabama, have invented certain new and useful Improvements in Bicycle-Brakes; and I do hereby declare the following to be a full, clear, and exact description of the invention, such as will enable others skilled in the art to which it appertains to make and use the same.

This invention relates to brakes for bicycles; and it has for its object to provide a simple and cheap construction which may be easily and quickly attached to the seat-post tube of the ordinary bicycle at a point just above the crank-hanger in position for ready operation by the foot of the rider to throw it into engagement with the rear wheel of the bicycle.

A further object of the invention is to provide a brake which will be effective in its operation and which will not jam the wheel when thrown thereagainst with maximum force, other objects and advantages of the invention being apparent from the following description.

In the drawings forming a portion of this specification, and in which like numerals of reference indicate similar parts in both views, Figure 1 is a side elevation showing a bicycle equipped with the present brake. Fig. 2 is a transverse section through the seat-post tube and showing the brake mechanism in top plan.

Referring now to the drawings, there is shown a brake mechanism comprising a collar 5, which is separable in form and is adapted to be clamped around the seat-post tube 6 of a bicycle-frame at a point just above the crank-hanger, said collar having suitable clamping means for holding it in place and which when loosened permit of adjustment of the collar to the proper point vertically of the tube. Upon the collar, at diametrically opposite points thereof, are the ears 7 and 8, with which are pivotally engaged the sides 9 and 10 of the brake-lever, this brake-lever consisting of a metal plate which is bent upon itself to form the said sides and the connecting web portion 11 at the front end of the lever, the upper edges of the sides adjacent to the web portion being serrated to prevent slipping of the foot of the operator when it is placed upon the lever to operate the brake. The sides 9 and 10 extend rearwardly beyond the tube 6, and the rear ends thereof are perforated to receive the axle 12, on which is mounted the rubber brake-roller 13, so disposed that when the outer or forward end of the lever is depressed said roller will be swung into engagement with the tire of the rear wheel 14 of the bicycle at a point below the fulcrum of the lever, said lever being arc-shaped, as illustrated, to insure this operation. One end of the axle of the brake-roller has a head 15, and the other end is threaded to receive a nut 16, so that the axle is held in engagement with the sides of the lever, the head and nut of the axle acting to hold the sides of the lever in engagement with the ears or trunnions upon the collar.

With this construction it will be seen that the front end of the lever may be depressed to throw the brake-wheel against the tire of the rear wheel of the bicycle with the proper force, while the rotatable mounting of the engaging portion of the brake insures against any evil results of excessive pressure upon the brake, the brake being returned to its normal position when released by means of the helical springs 18, which are mounted upon the ears or trunnions of the collar and have their ends connected to the sides of the lever and the tube 6.

What is claimed is—

As an article of manufacture, a bicycle-brake comprising a clamping-collar having trunnions at diametrically opposite points thereof, a lever formed from a metallic plate bent to form parallel spaced members and a connecting-bight, said members being bent longitudinally into arc shape and having alining perforations at their centers and other alining perforations adjacent to their free ends, said members being disposed with the trunnions pivotally engaged with the first-mentioned perforations, a bolt engaged in the second-named perforations of the members to hold said members in engagement with the trunnions, a roller revolubly mounted upon the bolt, and a spring connected to the trunnions and bearing against the spaced members at its free ends and having a yoke arranged for engagement with the central upright of a bicycle with which the collar is engaged to hold the roller yieldably out of engagement with the rear wheel of the bicycle.

In testimony whereof I affix my signature in presence of two witnesses.

JEFF CHAMBLISS.

Witnesses:
  SOL YOUNG,
  ALLEN CHAMBLISS.